Oct. 25, 1966     C. F. BOWERSETT     3,280,563
THRUST VECTORING SYSTEM
Filed Oct. 26, 1962

INVENTOR
CHARLES F. BOWERSETT
BY *O. D. Hodges*
ATTORNEY

United States Patent Office 3,280,563
Patented Oct. 25, 1966

3,280,563
THRUST VECTORING SYSTEM
Charles F. Bowersett, Burtonsville, Md., assignor to the United States of America as represented by the Secretary of the Navy
Filed Oct. 26, 1962, Ser. No. 234,014
7 Claims. (Cl. 60—232)

The invention described herein may be manufactured and used by or for the Government of the United States of America for governmental purposes without the payment of any royalties thereon or therefor.

The present invention relates to a thrust vectoring system for solid propellant rocket motors and more specifically to a hinged nozzle whose entrance projects into the combustion cavity of a solid propellant rocket motor in order to reduce the heat flow from the combustion cavity to the mounting base of the nozzle exterior to the body of the nozzle itself.

Hinged nozzles generally are well known in the art and have been extensively used in thrust vectoring systems for steering missiles and in guidance control for jet aircraft. These prior art systems have employed hinged nozzles mounted in such a way at the combustion chamber of the motor used therewith as to induce hot gaseous flow and extensive heat to the mounting base of the nozzle. It has been customary to limit the extent of the convergent end of the nozzle to the plane of the outermost section of the combustion chamber and to attach a moving seal to either the exterior of the nozzle or the nozzle mounting means. This type of mounting allows gases to flow across the seal and thus causes a substantial transfer of heat to the nozzle mounting means. It has been necessary to provide a seal of extreme durability between the nozzle and the mounting means therefor which is able to withstand extremely high temperatures caused by propellant combustion in close proximity but exterior to the nozzle throat. This seal is difficult to maintain under the high temperatures and pressure and has caused high hinge loads due to the friction of the seal interposed between the nozzle mounting base and the nozzle itself. Any leakage through the seal will cause rapid deterioration of the nozzle mounting means.

It is the general object of the present invention to provide a hinged nozzle obtruding substantially into the combustion chamber of a rocket motor or the like in order to reduce the heat transfer directly to the nozzle mounting means from the combustion chamber.

It is another object of this invention to reduce the temperature requirements of the sealing medium between the nozzle throat and the nozzle mounting means.

A further object of the invention is to reduce the frictional loads by elimination of the moving seal heretofore used with hinged nozzles of this type.

A still further object is to reduce the hinge moments about the axis of nozzle rotation by lowering the bearing temperature at the discharge end of the nozzle mounting means.

Other objects and features of the invention will become apparent to those skilled in the art as the disclosure is made in the following detailed description of the embodiment of the invention illustrated in the accompanying drawing in which.

Figure 1:
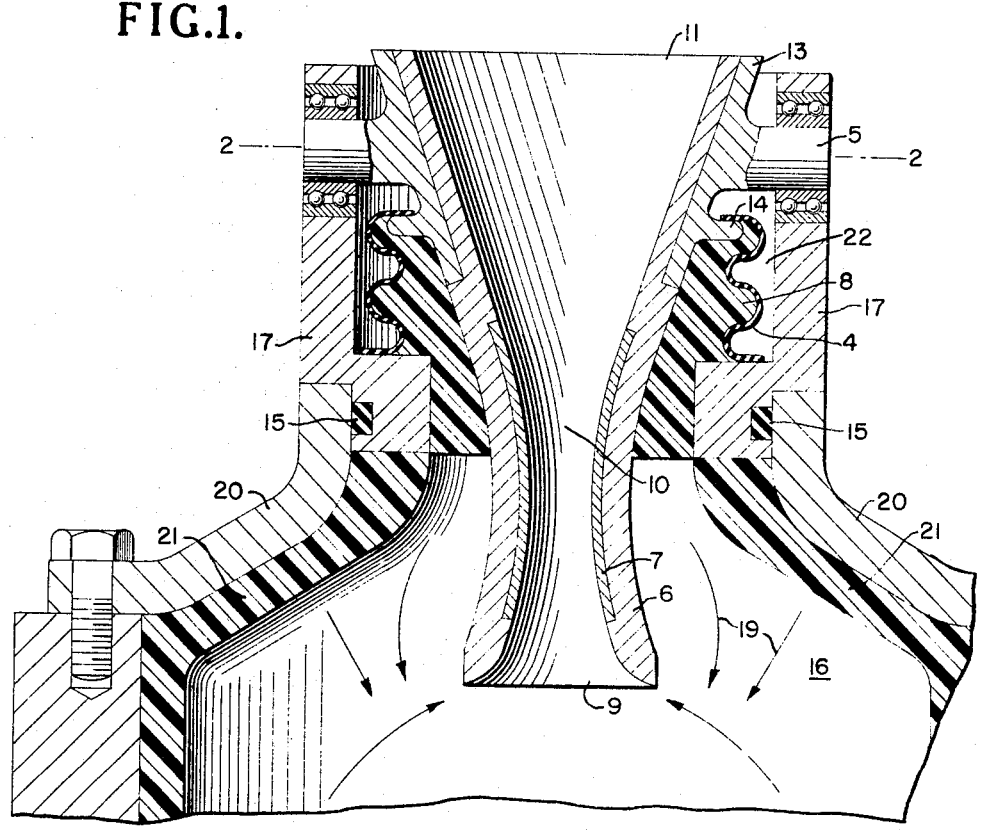
FIG. 1 is a longitudinal section view of the hinged nozzle thrust vectoring system of the present invention.

Referring now to FIG. 1 the hinged nozzle comprises a convergent-divergent nozzle 6 which may be made from various refractory materials and includes a throat liner 7 which may also be made from refractory materials or carbon. The divergent section of nozzle 6 has a ring 13 surrounding its outer periphery at the discharge end thereof which includes a pair of trunnions 5 and is rotatably mounted to move about axis 2—2. The trunnions 5 and ring 13 may be constructed from stainless steel, molybdenum, tungsten or similar materials. The nozzle mounting means also includes a housing 17 pivotally engaging the trunnions 5 on each side of the nozzle. The housing 17 is usually constructed from steel or an alloy thereof.

Ring 13 further includes a projection 14 to which a bellows seal 4 has one of its ends secured, and the bellows has its other end secured to the inner portion of housing 17. The bellows seal 4 forms with the exterior portion of the nozzle 6 and the housing 17 an opening in which a pliable compound 8 is disposed. This compound may be a plastic or a silicone grease. The housing 17 is abutted at its lower ends by a bulkhead 20 which is steel and is insulated on its inner edges by an insulation material 21 which may be plastic or the trade name material Fiberite. An O-ring gasket 15 is mounted in fixed relation between the bulkhead 20 and housing 17. The combustion chamber 16 extends past the entrance to the nozzle 6 to the edge of the seal comprising pliable compound 8 which surrounds the nozzle at the throat section thereof. The entrance to the nozzle 6 projects far enough into the combustion chamber 16 so that propellant burning in the vicinity of the nozzle seat and the outermost portion of the combustion chamber in close proximity to compound 8 flows away from the compound 8 in order to enter the obtruded nozzle. The outermost portion of the combustion chamber 16 will therefore contain substantially only static gases, and the heat in this area will tend to move towards the entrance of the nozzle 6. Due to this reduction in heat at the outermost portion of the chamber 16 a bellows seal 4 which has one side suspended in an air gap 22 in FIG. 1 will be adequate. The pliable compound 8 may or may not be used depending upon materials used in the nozzle mounting means and temperatures to be encountered in the combustion chamber 16. This type of seal 4 and compound 8 greatly reduces frictional loads on the nozzle heretofore encountered with most of the prior art moving seals.

Figure 2:
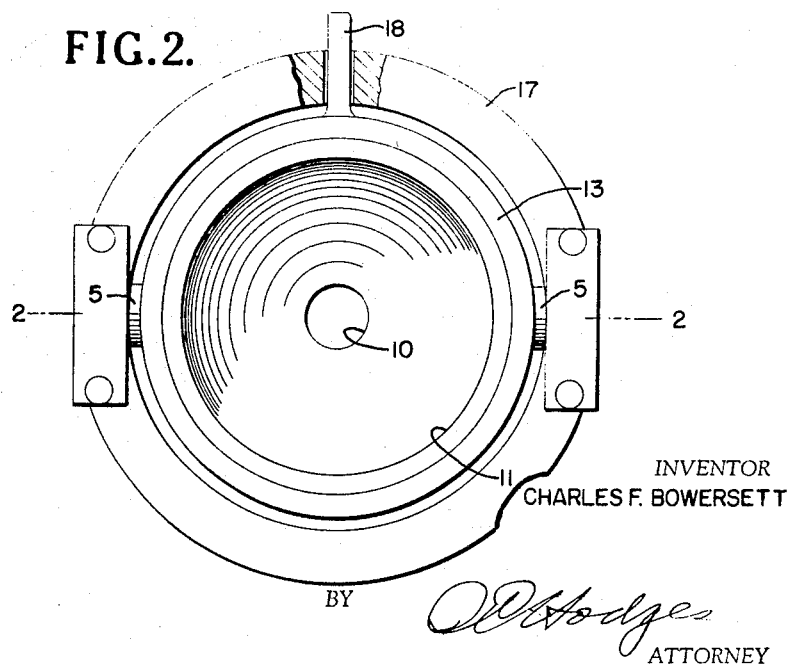
FIG. 2 is a partial plan view partly broken away of the device of FIG. 1.

FIG. 2 is a view looking into the discharge end of the nozzle and shows only the outer periphery of section 13 from which the trunnions 5 extend into housing 17 and upon which an actuation arm 18 is mounted to control the position of rotation of the nozzle 6 about an axis 2—2.

The nozzle construction of the present invention is of a comparatively cool type due to the reduction of high bearing temperatures present in similar prior art devices. The design of the present invention is less complex than that of similar prior art nozzles due to the simplicity of the sealing means comprising bellows seal 4 and pliable compound 8. This type of seal is inexpensive and the use of a flexible compound of this type provides lower hinge moments upon rotation of the nozzle about the axis 2—2. The obtrusion of nozzle 6 into combustion chamber 16 was made solely for the purpose of creating an area of static gas in the vicinity of the nozzle seat. The propellant burning in this area of the combustion chamber 16 will flow in a path as indicated by arrows 19 in FIG. 1 and thus will tend to reduce the heat transferred to the seal.

Obviously many modifications and variations of the present invention are possible in the light of the above teachings. It is therefore to be understood, that within the scope of the appended claims, the invention may be practiced otherwise than is specifically described.

What is claimed is:
1. A thrust vectoring system comprising:
a nozzle providing a thrust at its discharge end at the instance of gas flow therethrough;
means surrounding the outer periphery of said nozzle in sealing relation therewith including laterally projecting trunnion means;

a hollow nozzle mounting means including a housing surrounding said nozzle and having an inner surface area substantially greater than the outer surface area of said means surrounding said nozzle, said housing further including bearing means rotatably engaging said trunnion means allowing said nozzle to move in a partial arc;

a bellows seal extending from said surrounding means to said housing to substantially eliminate gas and heat flow to said housing;

pliable means disposed between said nozzle and said housing and in intimate contact with said bellows seal, a portion of the surface area of said surrounding means and a portion of the inner surface of said hollow nozzle mounting means, to substantially attenuate the flow of hot gases therethrough;

and a combustion chamber in juxtaposition with said housing and completely surrounding a substantial longitudinal portion of said nozzle including the entrance thereto which projects from said housing into said combustion chamber whereby hot gases caused by propellant burning in the vicinity of said pliable means will flow toward said entrance and away from said pliable means.

2. A thrust vectoring system comprising:

a contoured nozzle having a throat section of minimum diameter, an exhaust section of maximum diameter and an entrance section of intermediate diameter;

means surrounding and in sealing relationship with said exhaust section including trunnion means projecting laterally therefrom;

a hollow housing surrounding said nozzle and having an inner surface area substantially greater than the outer surface area of said surrounding means, said housing further including bearing means rotatably engaging said trunnion means;

a bellows seal extending from said surrounding means to said housing to substantially attenuate gas and heat flow to said housing, and a combustion chamber in juxtaposition with said housing and completely surrounding said entrance section and a substantial longitudinal portion of said throat section of said nozzle, said entrance and throat sections projecting from said housing into said combustion chamber whereby heat caused by gases burning in said combustion chamber in proximity to said bellows seal will flow toward said entrance section of the nozzle.

3. The combination of claim 2 including pliable means disposed between and in intimate contact with said bellows seal, said housing and said nozzle to further restrict the transfer of heat from said combustion chamber directly to said housing.

4. A thrust vectoring system comprising:

a nozzle having an intake section, a throat section and an exhaust section, said intake, throat and exhaust sections being integrally formed to define a continuous converging-diverging nozzle;

a motor combustion chamber; said nozzle having the intake section and a portion of said throat section extended into said chamber;

a hollow housing means axially supporting and rotatably engaging said nozzle at the exhaust section thereof and in juxtaposition with said chamber, said housing means having an inner surface area substantially greater than the outer surface of said nozzle thereby providing a space between said housing and said nozzle, and a bellows seal extending from said housing to said nozzle whereby hot gas and heat transfer therethrough is held at a minimum.

5. The combination in claim 4 including a pliable material disposed between and in intimate contact with said housing, said nozzle and said bellows.

6. Combination in claim 5 wherein said pliable material is a plastic.

7. Combination in claim 5 wherein said pliable material is a silicone grease.

References Cited by the Examiner

UNITED STATES PATENTS

| | | | |
|---|---|---|---|
| 2,424,897 | 7/1947 | Orshansky | 60—35.55 |
| 3,016,697 | 1/1962 | Sternberg et al. | 60—35.55 X |
| 3,032,982 | 5/1962 | Gaubatz | 60—35.55 |
| 3,048,010 | 8/1962 | Ledwith | 60—35.55 |
| 3,050,938 | 8/1962 | Twyford | 60—35.55 |
| 3,069,853 | 12/1962 | Eder | 60—35.55 |
| 3,090,198 | 5/1963 | Zeisloft | 60—35.55 |

MARK NEWMAN, *Primary Examiner.*

SAMUEL FEINBERG, BENJAMIN A. BORCHELT,
*Examiners.*

G. L. PETERSON, G. H. GLANZMAN,
*Assistant Examiners.*